(12) United States Patent
Tamir et al.

(10) Patent No.: US 7,280,970 B2
(45) Date of Patent: Oct. 9, 2007

(54) SONIC/ULTRASONIC AUTHENTICATION DEVICE

(75) Inventors: Asaf Tamir, Ramal Gan (IL); Alan Sege, Santa Monica, CA (US); Nir Dvash, Petach Tikva (IL); Nathan Altman, Tel Aviv (IL); Alon Atsmon, Yehud (IL)

(73) Assignee: BeepCard Ltd., Tel-Aviv (IL)

( * ) Notice: Subject to any disclaimer, the term of this patent is extended or adjusted under 35 U.S.C. 154(b) by 464 days.

(21) Appl. No.: 09/853,017

(22) Filed: May 10, 2001

(65) Prior Publication Data

US 2002/0169608 A1  Nov. 14, 2002
US 2004/0220807 A9  Nov. 4, 2004

Related U.S. Application Data

(63) Continuation-in-part of application No. 09/806,789, filed as application No. PCT/IL99/00525 on Oct. 4, 1999.

(51) Int. Cl.
*G10L 17/00* (2006.01)

(52) U.S. Cl. ........................................ 704/273; 704/246

(58) Field of Classification Search ................ 704/231, 704/246, 251, 270, 270.1, 271–276, 278; 379/69.1, 88.01–88.18, 88.22, 88.27, 88.28, 379/90.01, 91.01, 93.01, 93.02, 93.04–93.09, 379/93.11–93.12, 93.03, 142.05, 142.06; 235/492, 487; 713/150, 161, 168, 169, 170, 713/176; 380/247; 340/5.8, 5.81–5.85; 705/50, 67, 44; 703/246

See application file for complete search history.

(56) References Cited

U.S. PATENT DOCUMENTS

| 2,990,646 A | 7/1961 | Berger |
| 3,961,323 A | 6/1976 | Hartkorn |
| 4,207,696 A | 6/1980 | Hyman et al. |
| 4,231,184 A | 11/1980 | Corris et al. |
| 4,264,978 A | 4/1981 | Whidden |
| 4,353,064 A | 10/1982 | Stamm |
| 4,390,877 A | 6/1983 | Curran |
| 4,614,861 A | 9/1986 | Pavlov et al. |

(Continued)

FOREIGN PATENT DOCUMENTS

DE 19645071 5/1998

(Continued)

OTHER PUBLICATIONS

Encotone, Ltd.—Corporate Background; 2 pages; 1198; Retrieved from the Internet at <http://web.archive.org/web/19981205164055/www.encotone.com/html/comp_def.html>.

(Continued)

*Primary Examiner*—Susan McFadden

(57) ABSTRACT

A method for verifying and identifying users, and for verifying users' identity, by means of an authentication device capable of transmitting, receiving and recording audio or ultrasonic signals, and capable of converting the signals into digital data, and performing digital signal processing. Voice pattern(s) and user(s) information of one or more authorized user(s) are recorded and stored on the authentication device. User(s) identification is verified by inputting to the authentication device a vocal identification signal from a user, and comparing the voice pattern of the vocal identification signal with the recorded voice pattern(s) of the authorized user(s), and if a match is detected issuing an indication that the user is identified as an authorized user.

17 Claims, 5 Drawing Sheets

U.S. PATENT DOCUMENTS

| | | | |
|---|---|---|---|
| 4,637,007 A | 1/1987 | Sakurai | |
| 4,640,034 A | 2/1987 | Zisholtz | |
| 4,641,374 A | 2/1987 | Oyama | |
| 4,673,371 A | 6/1987 | Furukawa | |
| 4,677,657 A * | 6/1987 | Nagata et al. | 455/558 |
| 4,682,370 A | 7/1987 | Matthews | |
| 4,696,653 A | 9/1987 | McKeefery | |
| 4,717,364 A | 1/1988 | Furukawa | |
| 4,766,294 A | 8/1988 | Nara et al. | |
| 4,814,591 A | 3/1989 | Nara et al. | |
| 4,818,855 A | 4/1989 | Mongeon et al. | |
| 4,840,602 A | 6/1989 | Rose | |
| 4,851,654 A | 7/1989 | Nitta | |
| 4,857,030 A | 8/1989 | Rose | |
| 4,924,075 A | 5/1990 | Tanaka | |
| 4,935,907 A | 6/1990 | Friedman | |
| 4,942,534 A | 7/1990 | Yokoyama et al. | |
| 4,961,229 A | 10/1990 | Takahashi | |
| 4,973,286 A | 11/1990 | Davison | |
| 4,978,840 A | 12/1990 | Anegawa | |
| 4,984,380 A | 1/1991 | Anderson | |
| 5,032,099 A | 7/1991 | Chan | |
| 5,072,103 A | 12/1991 | Nara | |
| 5,085,610 A | 2/1992 | Engel et al. | |
| 5,176,560 A | 1/1993 | Wetherell et al. | |
| 5,191,615 A | 3/1993 | Aldava et al. | |
| 5,209,695 A | 5/1993 | Rothschild | |
| 5,241,160 A | 8/1993 | Bashan et al. | |
| 5,280,527 A | 1/1994 | Gullman et al. | |
| 5,289,273 A | 2/1994 | Lang | |
| 5,307,051 A | 4/1994 | Sedlmayr | |
| 5,314,336 A | 5/1994 | Diamond et al. | |
| 5,324,038 A | 6/1994 | Sasser | |
| 5,356,326 A | 10/1994 | Ting | |
| 5,376,778 A | 12/1994 | Kreft | |
| 5,407,376 A | 4/1995 | Avital et al. | |
| 5,423,073 A | 6/1995 | Ogawa | |
| 5,434,398 A | 7/1995 | Goldberg | |
| H1469 H | 8/1995 | Simonoff | |
| 5,452,901 A | 9/1995 | Nakada et al. | |
| 5,467,095 A | 11/1995 | Rodal et al. | |
| 5,479,408 A | 12/1995 | Will | |
| 5,517,194 A | 5/1996 | Carroll et al. | |
| 5,522,089 A | 5/1996 | Kikinis et al. | |
| 5,523,749 A | 6/1996 | Cole et al. | |
| 5,539,819 A | 7/1996 | Sonoyama et al. | |
| 5,552,790 A | 9/1996 | Gunnarsson | |
| 5,579,537 A | 11/1996 | Takahisa | |
| 5,583,933 A | 12/1996 | Mark | |
| 5,606,732 A | 2/1997 | Vignone, Sr. | |
| 5,623,552 A | 4/1997 | Lane | |
| 5,629,867 A | 5/1997 | Goldman | |
| 5,629,981 A | 5/1997 | Nerlikar | |
| 5,635,701 A | 6/1997 | Gloton | |
| 5,638,047 A | 6/1997 | Orloff et al. | |
| 5,638,450 A | 6/1997 | Robson | |
| 5,640,003 A | 6/1997 | Makino | |
| 5,646,907 A | 7/1997 | Maccabee | |
| 5,647,787 A | 7/1997 | Raviv et al. | |
| 5,655,945 A | 8/1997 | Jani | |
| 5,697,829 A | 12/1997 | Chainani et al. | |
| 5,698,836 A | 12/1997 | Fujioka | |
| 5,708,853 A | 1/1998 | Sanemitsu | |
| 5,717,168 A | 2/1998 | DeBuisser et al. | |
| 5,719,387 A | 2/1998 | Fujioka | |
| 5,731,757 A | 3/1998 | Layson, Jr. | |
| 5,740,232 A | 4/1998 | Pailles et al. | |
| 5,742,677 A * | 4/1998 | Pinder et al. | 380/242 |
| 5,745,555 A * | 4/1998 | Mark | 379/93.03 |
| 5,752,880 A | 5/1998 | Gabai et al. | |
| 5,761,606 A | 6/1998 | Wolzien | |
| 5,763,862 A | 6/1998 | Jachimowicz et al. | |
| 5,764,512 A | 6/1998 | Michel et al. | |
| 5,764,763 A | 6/1998 | Jensen et al. | |
| 5,764,900 A | 6/1998 | Morris et al. | |
| 5,774,791 A | 6/1998 | Strohallen et al. | |
| 5,778,071 A * | 7/1998 | Caputo et al. | 713/159 |
| 5,778,187 A | 7/1998 | Monteiro et al. | |
| 5,786,764 A | 7/1998 | Engellenner | |
| 5,786,988 A | 7/1998 | Harari | |
| 5,789,733 A | 8/1998 | Jachimowicz et al. | |
| 5,793,305 A | 8/1998 | Turner et al. | |
| 5,800,243 A | 9/1998 | Berman | |
| 5,805,676 A * | 9/1998 | Martino | 379/93.17 |
| 5,809,245 A | 9/1998 | Zenda | |
| 5,815,020 A | 9/1998 | Allen et al. | |
| 5,818,030 A | 10/1998 | Reyes | |
| 5,825,871 A * | 10/1998 | Mark | 379/357.03 |
| 5,847,662 A | 12/1998 | Yokota et al. | |
| 5,847,752 A | 12/1998 | Sebestyen | |
| 5,850,077 A | 12/1998 | Tognazzini | |
| 5,859,913 A | 1/1999 | Goreta et al. | |
| 5,861,841 A | 1/1999 | Gildea et al. | |
| 5,864,794 A | 1/1999 | Tasaki | |
| 5,870,155 A | 2/1999 | Erlin | |
| 5,880,769 A | 3/1999 | Nemirofsky et al. | |
| 5,881,149 A | 3/1999 | Weatherill | |
| 5,884,271 A | 3/1999 | Pitroda | |
| 5,903,721 A | 5/1999 | Sixtus | |
| 5,905,865 A | 5/1999 | Palmer et al. | |
| 5,907,142 A | 5/1999 | Kelsey | |
| 5,914,980 A | 6/1999 | Yokota et al. | |
| 5,921,674 A | 7/1999 | Koczi | |
| 5,955,961 A | 9/1999 | Wallerstein | |
| 5,963,643 A | 10/1999 | Goreta et al. | |
| 5,986,562 A | 11/1999 | Nikolich | |
| 5,987,509 A | 11/1999 | Portuesi | |
| 6,010,074 A | 1/2000 | Kelly et al. | |
| 6,014,083 A | 1/2000 | Bauerschmidt et al. | |
| 6,016,476 A | 1/2000 | Maes et al. | |
| 6,018,641 A | 1/2000 | Tsubouchi et al. | |
| 6,019,285 A | 2/2000 | Isobe et al. | |
| 6,021,119 A | 2/2000 | Derks et al. | |
| 6,023,509 A | 2/2000 | Herbert et al. | |
| 6,023,779 A | 2/2000 | Fullam et al. | 714/751 |
| 6,036,099 A | 3/2000 | Leighton | |
| 6,058,373 A | 5/2000 | Blinn et al. | |
| 6,060,332 A | 5/2000 | Martin | |
| 6,079,621 A * | 6/2000 | Vardanyan et al. | 235/487 |
| 6,081,782 A * | 6/2000 | Rabin | 704/275 |
| 6,089,942 A | 7/2000 | Chan | |
| 6,097,292 A | 8/2000 | Kelly et al. | |
| 6,098,106 A | 8/2000 | Philyaw et al. | |
| 6,110,000 A | 8/2000 | Ting | |
| 6,119,228 A | 9/2000 | Angelo et al. | |
| 6,125,172 A | 9/2000 | August et al. | |
| 6,125,452 A | 9/2000 | Kuriyama | |
| 6,176,837 B1 | 1/2001 | Foxlin | |
| 6,182,044 B1 | 1/2001 | Fong et al. | |
| 6,186,396 B1 * | 2/2001 | Crandall, Jr. | 235/379 |
| 6,194,993 B1 | 2/2001 | Hayashi et al. | |
| 6,195,693 B1 | 2/2001 | Berry et al. | |
| 6,211,858 B1 | 4/2001 | Moon et al. | |
| 6,222,880 B1 | 4/2001 | Eastmond et al. | |
| 6,233,736 B1 | 5/2001 | Wolzien | |
| 6,236,724 B1 | 5/2001 | Labaton et al. | 379/357.03 |
| 6,237,026 B1 | 5/2001 | Prasad et al. | |
| 6,244,260 B1 | 6/2001 | Ragoza et al. | |
| 6,257,486 B1 | 7/2001 | Teicher et al. | |
| 6,272,228 B1 | 8/2001 | Martin | |
| 6,289,114 B1 | 9/2001 | Mainguet | |
| 6,292,437 B1 | 9/2001 | Beard | |
| 6,309,275 B1 | 10/2001 | Fong et al. | |
| 6,331,972 B1 * | 12/2001 | Harris et al. | 370/313 |

| | | | | | | |
|---|---|---|---|---|---|---|
| 6,332,163 | B1 | 12/2001 | Bowman-Amuah | JP | 07-087234 | 3/1995 |
| 6,360,953 | B1 | 3/2002 | Lin et al. | WO | 2 236 258 | 4/1991 |
| 6,377,670 | B1 | 4/2002 | Rosset et al. | WO | WO93/11619 | 6/1993 |
| 6,380,844 | B2 | 4/2002 | Pelekis | WO | WO93/21720 | 10/1993 |
| 6,385,314 | B1 | 5/2002 | Furuya | WO | WO94/17498 | 8/1994 |
| 6,389,055 | B1 | 5/2002 | August et al. | WO | WO96/10880 | 4/1996 |
| 6,389,935 | B1 | 5/2002 | Azima et al. | WO | WO97/15899 | 5/1997 |
| 6,400,996 | B1 * | 6/2002 | Hoffberg et al. ............... 700/83 | WO | WO97/16049 | 5/1997 |
| 6,445,780 | B1 | 9/2002 | Rosset et al. | WO | WO98/12670 | 3/1998 |
| 6,513,015 | B2 | 1/2003 | Ogasawara | WO | WO98/57474 | 12/1998 |
| 6,547,130 | B1 | 4/2003 | Shen | WO | WO99/22362 | 5/1999 |
| 6,556,768 | B1 | 4/2003 | Nakajima et al. | WO | WO99/23804 | 5/1999 |
| 6,556,965 | B1 | 4/2003 | Borland et al. | WO | WO 00/01456 | 1/2000 |
| 6,559,755 | B1 | 5/2003 | Hamamoto et al. | WO | WO 00/15316 | 3/2000 |
| 6,570,490 | B1 | 5/2003 | Saitoh et al. | WO | WO 00/21020 | 4/2000 |
| 6,607,136 | B1 * | 8/2003 | Atsmon et al. ............. 235/492 | WO | WO 00/21203 | 4/2000 |
| 6,647,063 | B1 | 11/2003 | Oikawa | WO | WO 00/29920 | 5/2000 |
| 6,661,563 | B2 | 12/2003 | Hayashi et al. | WO | WO 00/77751 | 12/2000 |
| 6,704,715 | B1 | 3/2004 | Rosset et al. | WO | WO 01/82223 | 11/2001 |
| 6,758,404 | B2 * | 7/2004 | Ladyansky ................. 235/492 | | | |
| 6,982,649 | B2 * | 1/2006 | Blum et al. ............. 340/815.4 | | | |
| 7,183,929 | B1 | 2/2007 | Antebi et al. | | | |
| 2001/0055202 | A1 | 12/2001 | Templeton et al. | | | |
| 2003/0159040 | A1 * | 8/2003 | Hashimoto et al. ......... 713/168 | | | |

FOREIGN PATENT DOCUMENTS

| | | |
|---|---|---|
| EP | 0526015 | 3/1993 |
| EP | 0789320 | 8/1997 |
| IL | WO 00/21020 * | 4/2000 |
| JP | 01-226091 | 8/1989 |

OTHER PUBLICATIONS

TeleID™ Major Applications; Encotone Ltd.; 4 pages; 1998; Retrieved from the Internet at <http://web.archive.web/www.encotone.com/html/app_def.html>.

TeleID™ System; "The Technology"; Encotone Ltd.; 8 pages; 1998; Retrieved from the Internet at <http://web.archive.org/web/19981205063057/www.encotone.com/html/tech_def.html>.

* cited by examiner

SONIC/ULTRASONIC AUTHENTICATION DEVICE

RELATED APPLICATIONS

The present application is a continuation-in-part of U.S. application Ser. No. 09/806,789, filed Jan. 22, 2002, which is a US national phase of PCT/IL99/00525, filed Oct. 4, 1999, published as WO 00/21020.

FIELD OF THE INVENTION

The present invention relates to the fields of voice recognition and voice verification. More particularly, the invention relates to a method and apparatus for verifying and identifying authorized users, for discriminating between them and unauthorized users, and for using voice input and output to control and activate user devices.

BACKGROUND OF THE INVENTION

Photographs, signatures, and identification numbers are commonly used to identify and verify the identity of individuals. However, these common identifying means are very easy to counterfeit, and in fact, the vast increase of business and financial transactions carried out over electronic means, such as the Internet and data communication, resulted in greater vulnerability of merchants, and end users to fraud and counterfeit.

Many of the modern ways of doing business enjoy the availability and speed of electronic communications, but do not require the presence of the entities involved at the time and place of transaction. It is therefore very easy for a malicious user to pretend to be someone else, and to carry out transactions in his name, once he gains access to some of his identifying details such as passwords, ID number, credit card numbers, etc. Although using passwords increase the security of such methods of doing business, and security layers (e.g. SSL) which utilize encryption provide more protection against eavesdropping, the main problem of identification and verification still remain.

Generally, the strength of a security system is measured by the number and diversity of the security "factors" that are required. Three such types of security factors are commonly known as "something you know" (e.g. a password); "something you have" (e.g. a magnetic card, smart card); and "something you are" (e.g. biometric measures such as voice.) For example, a password by itself may not provide complete security, because a holder may inadvertently disclose it, or the password can be guessed. Moreover, a magnetic card can be lost or stolen. Security is substantially enhanced when a password is used as one factor, and the authenticated presence of an identification card (e.g., magnetic card) is used as another factor.

The Internet and the World Wide Web (WWW) contain a variety of different sites for e-commerce and online services. In addition to news and information, merchants and consumers alike have come to view the web as a virtually unlimited source for conducting business, in the form of sales of products, services, and information. Nevertheless, many computer users are still somewhat wary of conducting sales transactions over the web especially because credit cards are involved, along with the associated fear of widespread and unchecked dissemination of the credit card numbers. These same users may also be worried about conducting non-Internet related sales transactions using credit cards. After all, anyone can swipe a credit card number and use it later for unauthorized purchases. Assurances from well-meaning web (and non-web) merchants do not alleviate these concerns, because the user has to carry a credit card in his person, which can be easily stolen or lost (and thus found by a thief). Moreover, the custom methods of conducting e-commerce utilized today are unsafe with respect to the relative ease in which sensitive users' information can be burglarized. Since the authentication is usually performed by a server connected to the a computer network and/or the Internet, sensitive user information, such as identification and/or credit card numbers, is vulnerable to hackers attacks and eavesdropping.

What is needed, therefore, is a secure purchasing mechanism that provides users with the peace of mind to make a purchase on the web (or any other form of electronic purchase or other secure information access) without the fear of having his credit card number stolen by someone listening-in at any point in the transaction.

Typically, systems that provide security to such online users do so to the detriment of user convenience. Because the Internet is a mass-medium, the success of online services depends largely on preserving user convenience. Without such convenience, users would become decreasingly tolerant resulting in a loss of business and social opportunities for both web merchants and users.

Traditional microprocessor credit cards, also known as "smart cards" or "chip cards," provide a good degree of security. But while smart cards that work in conjunction with dedicated smart card readers have become prevalent (i.e., bank cards in Europe), they are ill-suited for deployment as widespread Internet access control devices. Deploying smart card readers to users in their homes, for example, and educating users on their installation and use, is a cumbersome, expensive, and inconvenient process.

The prior art smart card systems were largely developed for a disconnected world; that is, maintaining a constant connection between the smart card and some other entity was considered expensive, inconvenient, and largely unnecessary. Indeed, the telephone charge itself was significant enough in cost to warrant minimizing such connection times.

One of the weaknesses of digital devices is their ease of duplication. Since digital devices embody binary information, a duplicated digital device can produce the same output as the original one. In order to overcome the duplication problem, the operation of the electric card can be made conditional on by the provision of a password, such as the password used in mobile phones. However, this solution is inconvenient, since the user has to type such password. Moreover, a password-protected device should comprise a set of keys, in order to enable to type a password. Passwords also must be remembered by the user, and hence they are inconvenient, and not secure, since a user may write them down instead of remembering them.

Voice verification (speaker verification) methods improve the identification capabilities and provide convenient implementations for the end user. In this method, the voice pattern of the users is utilized to identify him and to allow access only to authorized users. Voice recognition is sometimes utilized in conjunction with voice verification, or even as a stand-alone implementation, to determine if a predefined word or phrase (password) is vocally pronounced by an authorized user.

Usually, in voice verification applications the identity of individuals is verified by comparing their voice pattern, that is obtained when a predefined word or phrase is pronounced (password), with users' voice pattern stored in the authenticating system database. For such verification, a predefined word or phrase should be agreed on, and the voice pattern of the individual, to which the word or phrase is assigned, is processed and stored. In this verification scheme two of the factors that were discussed above are utilized, i.e., "something you know" and "something you are". However, when attempting to identify an individual, his voice pattern should be compared against the entire database of authorized individuals' patterns, which is a long process, and thus not always acceptable for electronic commerce and financial transactions.

In patent application U.S. Pat. No. 4,961,229, a biometric method for authentication/verification of individuals is disclosed, where the voice patterns of the authorized individuals are utilized for authentication. This method combines all of the security factors that were discussed before; "something you know", "'something you have", and "something you are". More particularly, the identity of an individual is authenticated by utilizing an additional identification device (magnetic card for instance) "something you have", comprising some identifying information of the user (names, identification numbers, etc.), and user's voice pattern. The verification process is initiated by enabling the verification system to access the identification device and interrogate the user's information, and voice pattern, stored on it. Once the details of that person are retrieved by the authenticating system, his voice pattern is compared with the voice pattern stored on his identification device. In this way the identification process is substantially shortened, since the pattern recognition test is performed with only one pattern.

To verify the presence of a particular individual, the voice pattern stored on the smart card is compared to his voice at the time of authentication. This type of security is robust against forgery, but requires dedicated hardware to input and process vocal signals, and the direct access to the information stored on a smart-card, which should be in the possession of each authorized entity, and which should be somehow connected to the authenticating system. Therefore, it is not adequate for authenticating individual users over the Internet or other electronic communication systems, since it requires smart card readers to be at the possession of the end-user (microphone & smart-card reader). In a similar fashion, WO 99/22362 describes a method for the identification of authorized users, by utilizing a mobile device on which users' identifying information, and a biometric voice pattern, are stored.

It should be understood that all the methods described above are performed online. Furthermore, the utilization of card readers, microphones, and other fixed hardware, eventuate in a fixed authentication system. In other words, none of those methods enable efficient realization of a mobile authentication system. As will be appreciated, the efficiency and satisfaction of transactions, such as e-commerce, will be substantially increased if the identity of the user can be verified before he interacts with the system. In this way, the time required for such transaction may be substantially reduced.

An additional limitation of those prior art systems that utilize smart cards and voice verification through software means on a general purpose computer that is subject to tampering, and is not portable to devices not possessing that software. The foregoing problems can be resolved by a voice verification apparatus that is embedded in the smart card itself, which is mobile, and not readily reprogrammable or addressable by interlopers.

Voice recognition is used to recognize vocally pronounced words, in a predefined language, or alternatively, in any language. There are some similarities between voice recognition and voice verification; while in voice verification the voice pattern of an individual is detected, in voice recognition the pattern of specific words is detected. Interactive Voice Response (IVR) utilities enable end-users to select a desired operations/option from a list of possibilities, by vocally pronouncing their selection. However, there is no operating application known in the art, in which a mobile device enables end users to vocal interaction with such systems.

All the methods described above have not yet provided convenient means for the vocal interaction of users with computerized systems, and satisfactory solutions to the problem of efficiently authenticating and verifying identity of individuals over data communication systems and computer networks, such as the Internet.

It is an object of the present invention to provide a method and apparatus for the fast and efficient identification of individuals, based on the identification of voice patterns.

It is another object of the present invention to provide a method and apparatus for enabling end users to vocally interact with user devices, and to carry out instructions received in the form of speech.

It is a further object of the present invention to provide a method and apparatus for carrying out the offline identification of individuals, where the identity of a user is verified before he interacts with, or gain access to, the system.

It is a still another object of the present invention to provide a method and apparatus for the vocal identification of individuals where the identification is performed by a mobile device carried by the user.

It is a yet another object of the present invention to provide a method and apparatus for converting vocal information into textual and/or digital data.

It is a still further object of the present invention to provide a method and apparatus for mobile IVR applications wherein users are presented with voice prompts (menus and/or instructions), and react, vocally, accordingly.

Other objects and advantages of the invention will become apparent as the description proceeds.

SUMMARY OF THE INVENTION

The following terms are defined as follows:

Smart card—a smart card is a card of the approximate dimensions of a credit card, with thicknesses that can vary, possessing an embedded microchip that can be loaded with data or computer programs. Under the present invention, the term "smart card" can be used interchangeably to refer to any physical token used for identification or information exchange purposes.

Voice recognition—the conversion of spoken words into digital data, by matching digitized speech signal against a database of waveforms, and converting matching speech signals into digital or textual data.

Voice pattern—vocal biometric enabling biological identification of individuals.

Voice verification—identification of individuals based on the recognition of their voice pattern.

IVR—Interactive Voice Response applications, enabling vocal interaction utilizing voice recognition methods (e.g., computerized operators of telephone services).

In one aspect, the invention is directed to a method for verifying and identifying users, and for verifying users' identity, by means of an authentication device capable of transmitting, receiving and recording audio and ultrasonic signals, and capable of converting the signals into digital data, and to perform digital signal processing, the method comprise recording on the authentication device voice pattern(s) of one or more authorized user(s), storing on the authentication device user information providing identifying details of the authorized user(s), inputting to the authentication device a vocal identification signal from a user, and comparing the voice pattern of the vocal identification signal with the recorded voice pattern(s) of the authorized user(s), and if a match is detected issuing an indication that the user is identified as an authorized user.

The method may comprise transmission of a predefined pattern of audio and/or ultrasonic signals, by the authentication device, whenever a match of voice patterns is detected. Alternatively, the method may comprise emitting a predefined pattern of light signals from a light-emitting device, to indicate a match of voice pattern.

According to one preferred embodiment of the present invention, the authentication device is a credit card sized device comprising a magnetic strip and/or a smart chip, wherein authentication is performed by inputting to the authentication device a vocal identification signal from a user, and comparing the voice pattern of the vocal identification signal with the recorded voice pattern(s) of the authorized user(s), and if a match is detected activating the magnetic strip and/or a smart chip and allowing a magnetic card reader to read the card information therefrom.

In a preferred embodiment of the present invention the authentication device is utilized to permit the access of user(s) to a computerized system, the method consists of:
  providing a computerized system including:
    an audio signal input device capable of receiving ultrasonic signals;
    a sound processing device suitable to receive inputs from the audio signal input device, and to receive audio and ultrasonic input signals, and capable of converting the signals into digital data;
    a data base containing of voice patterns of authorized users;
    an application capable of receiving digital data inputs from the sound processing device, of activating other applications, and of transmitting digital data over network links;
  transmitting from the authentication device an ultrasonic signal comprising the recorded voice pattern;
  receiving the ultra sonic signal by the audio signal input device;
  processing the ultrasonic signal and extracting the recorded voice pattern therefrom; and
  comparing the recorded voice pattern with the voice patterns stored in the database of authorized users, and if a match is detected enabling access to the computerized system.

In yet another preferred embodiment of the present invention, the authentication device is utilized to permit the access of user(s) to a computerized system by inputting a vocal identification signal of a user to an authentication device, transmitting from the authentication device an ultra sonic signal comprising the vocal identification signal and user information stored on the authentication device, receiving the ultrasonic signal by the audio signal input device, and processing the ultrasonic signal to extract therefrom the vocal identification signal and the user information, fetching from a database the voice pattern of the authorized user associated with the user information, and comparing the fetched voice pattern to the transmitted voice pattern to determine if they match, where if a match is detected enabling access to the computerized system, and if a match is not detected, disabling the access to the computerized system.

In accordance with another preferred embodiment of the present invention, the user verification is performed at a remote server connected to a computer network and/or the Internet by inputting a vocal identification signal of a user to an authentication device, transmitting from the authentication device an ultra sonic signal comprising the vocal identification signal and user information stored on the authentication device, receiving the ultrasonic signal by an audio signal input device, and processing the ultrasonic signal to extract the vocal identification signal and the user information, transmitting the vocal identification signal and the user information to the remote server, via the computer network and/or the Internet over a secure link, receiving the vocal identification signal and the user information by the remote server, fetching from a database the voice pattern of the authorized user associated with the user information, and comparing the fetched voice pattern with the transmitted voice pattern to determine if they match, where if a match is detected, enabling access to the remote server, and if a match is not detected, disabling the access to the remote server.

In accordance with yet another preferred embodiment of the present invention, the authentication device is utilized to permit the access of user(s) to a computerized system by inputting a vocal identification signal of a user to an authentication device, verifying the user identity on the authentication device, by the following steps:
  processing the vocal identification signal to obtain the user's voice pattern;
  comparing the voice pattern to the voice pattern stored on the authentication device, and transmitting an ultrasonic signal comprising a match or mismatch indication, and the user information;
  receiving the ultrasonic signal by an audio signal input device, and processing the ultrasonic signal to extract the match or mismatch indication and the user information; and
  enabling access to the computerized system whenever a match indication is extracted from the ultrasonic signal.

Preferably, the vocal identification signal, and the user information, are converted into digital data and modulated into an ultrasonic signal utilizing Frequency Shift Keying techniques. Optionally, audio signal input is received through telephony infrastructures, thereby allowing the identification of users through said telephony infrastructures. The method may further comprise an Interactive Voice Response device/application utilized for allowing access of authorized users to personal information, and/or manipulating said information.

According to a preferred embodiment of the present invention, voice recognition is utilized for the verification of authorized users, comprising a verification procedure in which the pronunciation of a predefined word or phrase is checked.

According to one preferred embodiment of the present invention, voice recognition is utilized to input into the authentication device vocal instructions received from the user by:
  playing a vocal menu, from the authentication device, where the vocal menu comprises an ordered list of possible options;
  inputting a vocal signal comprising the options selected by the user to the authentication device; and performing the task(s) associated with the selected option(s).

The method may further carrying out arithmetic calculation in combination with the vocal menu, by playing a vocal menu consisting one or more arithmetic operations, vocally selecting a desired arithmetic operation, vocally inputting the numeric value(s) on which said arithmetic operation should be performed, calculating the result of said arithmetic operation, and vocally outputting said result.

The method may further comprise calculating the extra payments to be paid in addition to a basic payment for a service, by activating an extra payment calculation function, vocally inputting the basic payment sum, calculating the extra payment to be paid according to said sum, and vocally outputting the extra payment calculation result.

In accordance with a preferred embodiment of the present invention, voice recognition is utilized to input vocal instructions received from the user, to the authentication device, comprising instructions for launching a selected application, or for performing selected tasks on a computerized system, by the following steps:
  inputting to the authentication device an audio signal, received from the user, comprising instruction to carry out a desired task;
  performing voice recognition procedures to recognize the desired task, spoken by the user;
  transmitting an ultrasonic signal comprising instructions for carrying out the desired task to the computerized system;
  receiving the ultrasonic signal by the audio signal input device, and processing the ultrasonic signal to extract the instructions; and
  performing the instructions.

According to another aspect, the invention is directed to an authentication device capable of transmitting, receiving and recording audio and ultrasonic signals, and capable of converting the signal into digital data, and performing digital signal processing, the authentication device includes:
  an input device capable of receiving audio and ultrasonic input signals and of outputting an analog electric signal;
  an analog-to-digital converter suitable to receive analog electric signals from the input device, and to output equivalent digital signals;
  a memory device for storing data;
  a press button for activating the device operation;
  a processing unit suitable to receive inputs from the press button, analog-to-digital converter, and to input and output digital data from/to the memory device;
  a digital-to-analog converter suitable to receive digital signals from the processing unit, and to output equivalent analog signals; and
  an output device capable of receiving analog electric signals and of transmitting audio and ultrasonic input signals, that receives analog signals from the digital to analog converter.

Optionally, a light-emitting device may be utilized to issue pattern of light pulses by the processing unit to indicate a match. The authentication device may comprise a magnetic strip to enable the authentication device to carry out financial transactions, in which the magnetic strip is activated by the processing unit whenever a match of the voice pattern is achieved.

Alternatively, according to a preferred embodiment of the present invention, an authentication apparatus for permitting or denying access to a computerized system, may consist a computerized system including:
  a sound processing device for receiving audio and ultrasonic signals, and for converting the signals into digital signals, and for receiving digital signals and outputting audio and ultrasonic signals;
  an input device for inputting audio and ultrasonic signals and for outputting their equivalent analog electric signals;
  means for connecting the output of the input device to the sound processing device;
  software means for processing digital signals; and
  a database of voice patterns of authorized users.

Optionally, the input device is connected to telephony infrastructures, for inputting audio signals over telephone lines.

According to another aspect of the present invention, the invention is directed to an apparatus capable of receiving and processing audio and ultrasonic signals, comprising a power source, an input device capable of receiving audio and ultrasonic input signals, and a data processing device capable of processing audio and ultrasonic signals.

According to yet another aspect of the present invention, the invention is directed to an apparatus capable of outputting audio and ultrasonic signals, comprising a power source, and an output device, operating in combination with a data processing device, capable of outputting audio and ultrasonic input signals.

DETAILED DESCRIPTION OF PREFERRED EMBODIMENTS

The present invention refers to a method for the identification of users and for carrying out tasks and transactions using vocal inputs from the user, storing the user's voice stamp and other acoustic inputs, and outputting acoustic and/or other signals to indicate and transmit status and/or commands A user device, equipped with an audio input and audio output devices, is utilized to vocally identify authorized user(s), and issue indications and/or instructions to the user and/or an automated system.

The automated system may be embodied by means of a computerized system, which may be also connected to a computer network and/or the Internet, or alternatively, by means of a telephony system such as automated telephony services, mobile phones or Personal Digital Assistant (PDA) devices.

Figure 1:
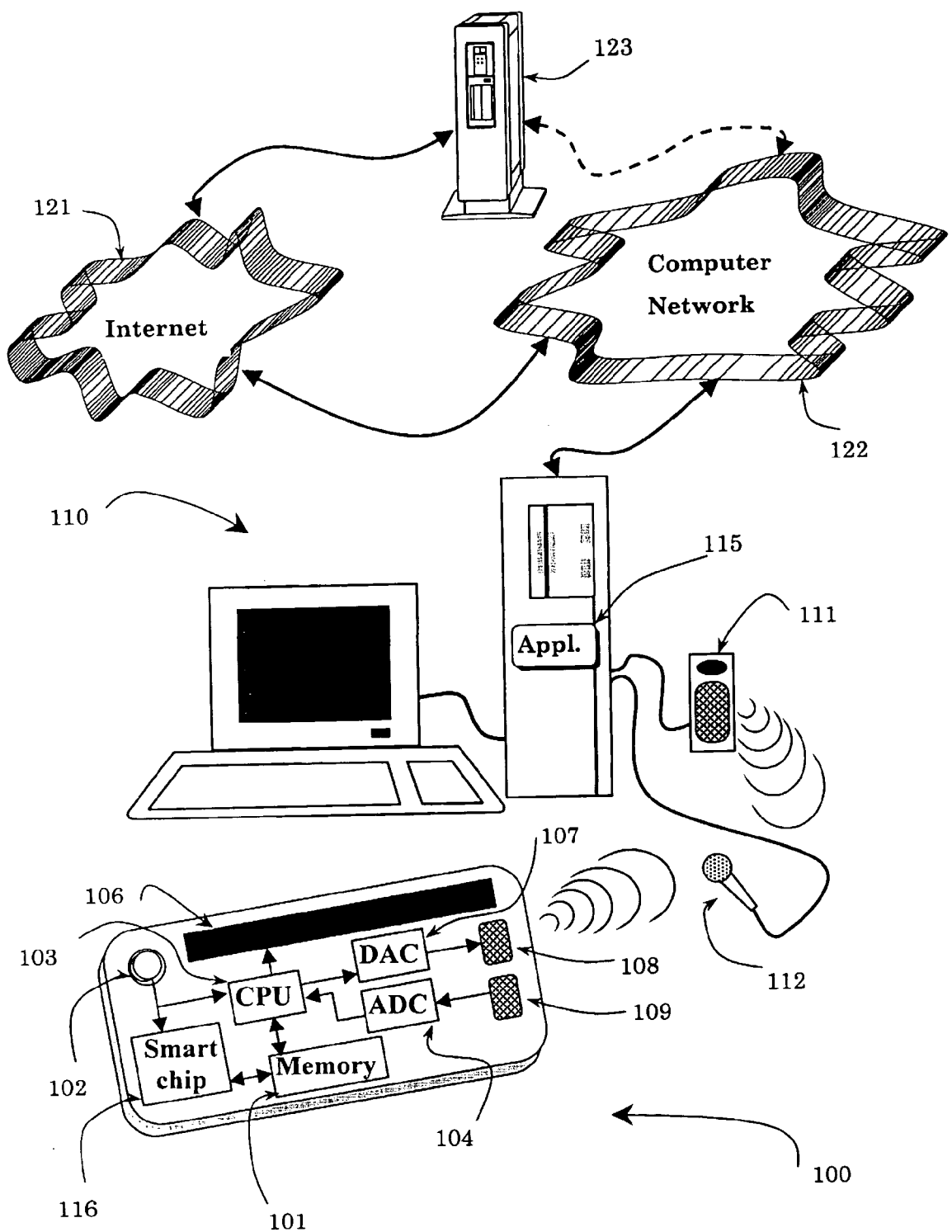
FIG. 1 schematically illustrates a preferred embodiment of the invention, including a smart card utilized for verification, and for performing transactions through a computerized system.

FIG. 1 schematically illustrates a preferred embodiment of the invention, in which a user device 100 is utilized to identify the user (the owner of the user device), and to interact with the computer system 110. As will be explained hereinafter, such an embodiment may be utilized to carry out a variety of operations, in addition to the verification of the identity of a user.

The user device 100 is equipped with two transducers, 108 and 109. Transducer 108 is utilized to output audio and ultrasonic signals (a speaker), and transducer 109 is utilized to input audio and ultrasonic signals (a microphone). A Central Processing Unit (CPU) 103 is utilized to perform Digital Signal Processing (DSP) and for controlling the operation of the user device 100. The signal inputs from the transducer 108 are provided to the CPU 103 in the form of digital data, via an Analog to Digital Converter (ADC) 104, and the output signals are provided from the CPU 103, in the form of digital data, to the transducer 109, via a Digital to Analog Converter (DAC) 107. Amplifier(s) (not illustrated) may be utilized to amplify the input and output signals.

In a preferred embodiment of the invention two dedicated transducers are utilized for outputting audio signals, a first dedicated transducer is utilized for telephony communication (to output sonic signals), and a second transducer is utilized for communication over the computer network(s) (e.g., Internet). It should be noted that each transducer may be utilized for the input, and for the output, of audible signals.

A memory device 101 is utilized to store identifying information which is utilized to identify the user (i.e., the owner of the user device 100), and also for storing software to be executed by the CPU 103, as well as other details and parameters of the user. A magnetic strip 106 may be also included on the user device 100, however its proper operation may be enabled/disabled by the CPU 103. A possible implementation for such a magnetic strip (106) may be obtained by utilizing a ferromagnetic loop embedded onto the user device 100, as disclosed in U.S. Pat. No. 5,434,398.

It should be noted that the same operation of the user device may be obtained by utilizing one transducer for inputting and for outputting signals. A smart chip may be embedded into the CPU 103, or alternatively, an independent smart chip 116 may be embedded into the user device 100. A similar user device is described in U.S. patent application Ser. No. 09/570,399 of the same applicant herein, wherein one or two transducers are utilized for the input/output of audio signals. In such embodiments of the invention each transducer may still be utilized for both inputting and outputting audio signals. For example, the user device 100 may be implemented with two transducers, wherein one transducer is dedicated for the input/output of sonic signals, and a second transducer, which is dedicated for the input/output of ultrasonic signals.

The user device 100 may be a standard credit card (bank card), or alternatively, it may be a non-standard card, embedded into a mobile phone, or any other form of consumer electronics (key chain, PDAs, mobile phones, etc.).

Figure 2:
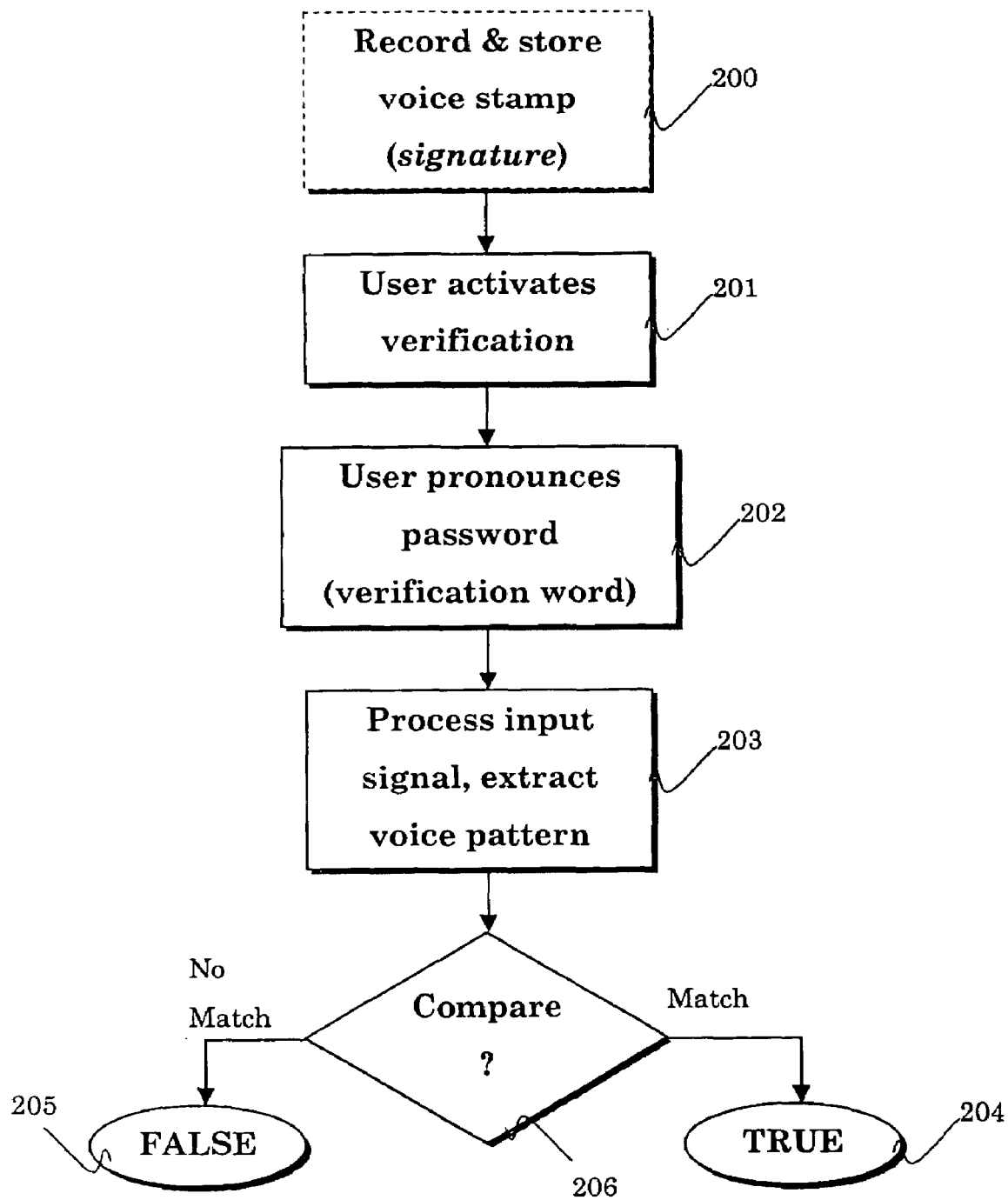
FIG. 2 is a flowchart illustrating the user verification process according to a preferred embodiment of the invention.

Voice recognition and voice verification techniques are utilized to verify the user identification, and for vocally inputting instructions and/or data to the user device 100. FIG. 2 is a flow chart illustrating the procedure required for user verification, according to one embodiment of the invention. The user device 100 is provided to the user only after his voice pattern (voice stamp) is stored in the memory device 101, step 200.

The operation of step 200 (designated by a dashed line) may be performed by the manufacturing and/or distributing credit card entity, or alternatively, this may be performed over the phone, or even by adding more keys (push buttons) to the user device, and enabling more manual operations option. However, it is important to note that this is performed utilizing the input transducer 109, on the user device 100, which is the same transducer that will be utilized for verification during normal operation of the user device. As will be appreciated by a skilled person, this substantially contributes to eliminating interfering distortions, which result from the utilization of different audio input devices. Thus, the voice stamp (also referred to herein as signature) stored on the user device's memory in step 200, is authentic and optimal for the verification task. The signature may comprise a digital recording of the voice stamp, which in turn may be a predetermined word/phrase (a password). Alternatively, the signature may comprise only parameters for identifying the user's speech patterns in general, or the user's speech patterns related to a predefined word/phrase which is pronounced by him.

When verifying the user's identity, (e.g., if he wishes to make a payment with the user device) a verification procedure is activated in step 201. In a preferred embodiment, the user will press the button 102 on the user device 100, and then pronounce a predetermined word/phrase, which is utilized as his signature. In effect when pressing on the button 102, the CPU activates the input circuitries on the user device, which causes the speech of the user to be collected by the transducer 109. The signal collected through transducer 109, is amplified and converted into a digital signal by ADC 104. The CPU 103 retrieves the digital signal from ADC 104, and in step 203 this digital signal is processed, and the voice pattern of the user is extracted.

The verification 206 is carried out by comparing the voice pattern of the signal retrieved, with the signature stored on the user device's memory 101. This stage of the verification depends on the type of verification scheme utilized. If the verification scheme is based on voice verification, the comparison of step 206 will be based on checking if the voice pattern of the user matches the voice pattern stored in the user device. This may comprise a test which checks whether the voice patterns are matching in general, or alternatively, this test may require that the pattern of the voice matches also that of the predefined word/phrase. On the other hand, if voice recognition is utilized, the test may consist of only checking that the predefined word/phrase are retrieved in step 202.

If the voice pattern matches the signature, a TRUE indication is issued in step 204. The effect of such indication depends on the type of application for which the user device is utilized. In one preferred embodiment of the invention the electronic user device 100 may comprise a Light Emitting Diode (LED) (not illustrated), which will emit a light pulse (or a pattern of pulses) in case of a TRUE indication 204. This type of authentication may be utilized, instead of the custom check of signatures and identification numbers utilized today.

Alternatively, the TRUE indication 204 may result in an activation or manipulation of the magnetic strip 106 of the user device or the smart chip 116, thus allowing the user to purchase with it merchandise or services. In this case, however, the magnetic strip 106 is activated for a limited time period, long enough to enable reading it by a magnetic strip reader.

In a preferred embodiment of the invention, a TRUE indication 204 results in the transmission of a verification signal through the transducer 108. This verification signal may comprise the user's signature, and data indicating his details and the verification results. This transmission is received by an audio input device 112 (microphone), which is connected to the computerized system 110, for instance, through a sound card. An application 115 running on the computerized system 110, processes the transmission collected by the input device 112, and extract the signature and other identifying information from the transmission. As will be described below, the communication with a computerized system 110 enables a wide range of possible applications, especially when the computerized system 110 is connected to a computer network 122, and/or the Internet 121.

In yet another embodiment of the invention, a TRUE indication 204 results in the broadcast by transducer 208 of synthesized speech, or another human audible sound indicating to humans that the voice is verified.

The invention may be embodied utilizing a telephone system instead of the computerized system 110. Such embodiments may be utilized for banking implementations wherein user identity is verified over the telephone utilizing the user device 100. Once user identity is verified, access permission to his account is permitted, and different transaction can then be carried out. The user device 100 may be further utilized to communicate with the banking system over the phone line, and to present the user with vocal menus/options and enable operations utilizing IVR utilities.

According to a preferred embodiment of the method of the invention, the same audio input device (microphone) is utilized for generation of the vocal stamp of the user, and for inputting the user's password (hereinafter referred to also as signature), and for verifying the user's identity.

Therefore, the signature is stored on the same device that performs the authentication, which, according to a preferred embodiment of the invention, is an electronic card. It is therefore possible to perform an offline verification of the user. In other words, the verification may be performed before the user initiates a transaction, for instance with an e-commerce server 123. It should be understood that in this case the user device 100 performs verification of user identification, and the authentication is actually performed by the server 128.

If the voice pattern of the user does not match to the signature stored in the memory 101, the CPU 103, in step 205 issues a FALSE indication. This FALSE indication 205 may be, for example, in the forms of one or more of the following;

Visual indication, for instance a blinking LED, or changing the color of a hologram (not shown) on the user device 100;

An audio output, through transducer 108, of a human or synthesized voice, announcing faulty verification;

A transmission through transducer 107, indicating to computerized system 110 that the user with the details found on the user device, is not authorized to use the device;

Inactivation of the magnetic stripe 106, or a smart card chip 116.

As will be further explained hereinafter, the output of the user device 100 is not limited to TRUE and FALSE indications, in the form of visual effects and/or human/machine voice. By utilizing methods for digital data transmission, the electronic user device 100 may be utilized to output packets of data comprising a variety of details about the user device 100, the user of the user device, and other data inputs. In a preferred embodiment of the invention, digital data is modulated by utilizing Frequency Shift Keying (FSK), or coded as DTMF or other means, and then transmitted as an ultrasonic signal, through transducer 109.

The utilization of audio and ultrasonic signals, for inputting and outputting data according to the method of the invention, is greatly advantageous. As described above, verification results may be relayed in the form of human or machine (synthesized) voice. On the other hand, the user device 100 can interact with any computerized system 110 having an audio input device 112 capable of inputting ultrasonic transmissions, that may be received by a running application 115, utilizing any regular sound card (not shown in the figure). Alternatively, as was described before, sonic transmission may be utilized for telephony applications (i.e., to perform transactions over telephone systems utilizing the user device).

According to a preferred embodiment of the invention, an application 115 running on the computerized system 110, retrieves the FSK or other data transmission from the user device 100, and demodulates or otherwise decodes the digital data, by utilizing Digital Signal Processing (DSP) techniques, such as those described in U.S. patent application Ser. No. 09/570,399, and in U.S. patent application entitled "A METHOD AND SYSTEM FOR REMOTELY AUTHENTICATING IDENTIFICATION DEVICES", filed on Mar. 22, 2001, both filed by the same applicant herein. It should be clear that implementations of the invention are not limited to FSK modulation, and that other methods of digital data communication may be exploited (e.g. PSK, DTMF).

Figures 3A, 3B:
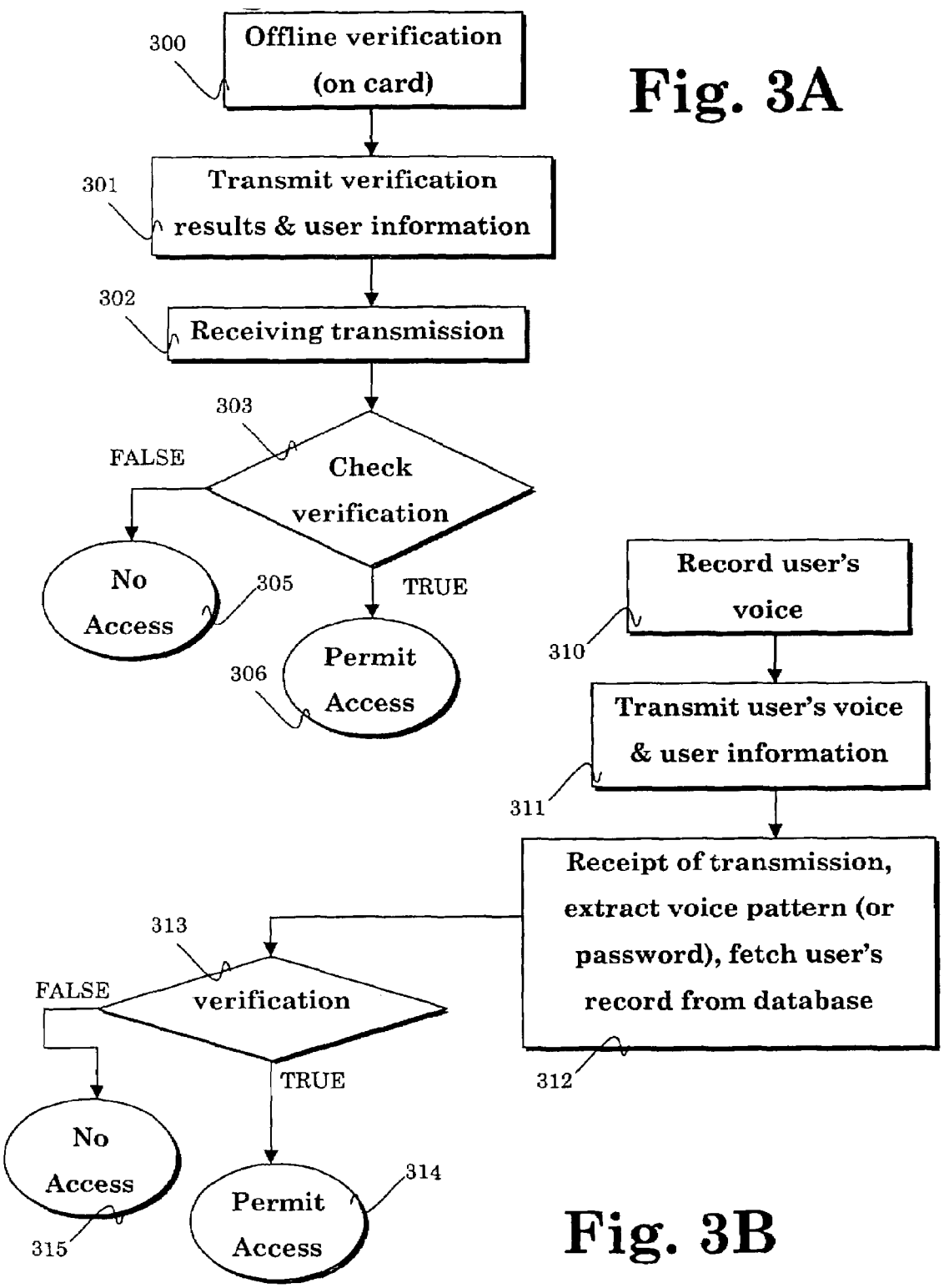
FIGS. 3a and 3b are flowcharts illustrating access permission schemes according to the method of the invention.

When such embodiment is utilized, access permission utilities may be easily and efficiently implemented. FIG. 3A and 3B are flowcharts illustrating two possible access permission implementations, according to preferred embodiment of the invention. FIG. 3A illustrates an access permission scheme in which the verification 300 is performed on the user device 100. The verification in step 300 is performed as described above, by receiving the user's voice signal through transducer 109, and comparing his voice pattern to the voice pattern stored in the user device 100 (voice verification), or alternatively, by checking if a predetermined password was pronounced by the user (voice recognition).

Such embodiments of the Invention, where user identification is performed on the user device, are particularly useful in telephony and IVR applications, and substantially improve the security. Since the user device performing the operation required for user verification, there is no need in transmission of user information, and there is no need in storing same information on a remote site (e.g., Internet server), where it may be exposed by hackers and/or eavesdroppers. Moreover, the authentication process is substantially faster than in methods where authentication is performed in a remote site, wherein the speed of the authentication depends on many variable parameters, such as communication speed, band-width, and reliability.

Once verification is completed, the results and the user device's details (user information) are transmitted, in step 301, through transducer 108, to the audio input device 112. In step 302 the transmission is received and processed by a running application 115, on a computerized system 110. The application 115 checks the verification results in step 303, and if a TRUE result is returned, in step 306, access is permitted. The transmission received in step 302 comprises the user device details, that contains information about the user. Thus the access permission of step 306 may comprise the performance of additional operations, such as:

Logging into the user account on the computer system 110, and thus allowing the user to interact with the computer system 110;

Playing a "welcome aboard" voice message through speaker 111, connected to the computer system 110;

Enabling transactions with a remote server 123, connected through a computer network 122 and/or the Internet 121.

If a FALSE result is returned, user access is denied (step 305). To improve the security, the number of FALSE access attempts 315 should be limited per user over a predefined period of time. It should be understood that another way to implement such an access permission scheme is to check verification 303 after step 300 (on the user device 100), right after the verification test is performed. In this way, if access is denied, the process is terminated without performing steps 301 and 302.

FIG. 3B illustrates an access permission scheme, which provides improved security. The access permission scheme described in FIG. 3A may be bypassed by forging a transmission comprising a TRUE indication and a user information. To improve the security, the verification test should be performed by the system to which access is sought. Thus, in such a scheme the user device 100 is utilized to record the user's voice (step 310), to the memory device 101, and to transmit the recorded voice along with user device details (user information) to the computer system 110.

The computer system 110 should comprise a database (not shown) comprising voice patterns (or passwords) of all the entities having access authorization. After transmission is received (step 312), the user's voice pattern (or his password) is extracted from the transmission, and his data record, comprising his signature (and/or password), is fetched from the database. In the next step, 313, the voice patterns (or passwords) are compared to verify the user's identity. If a match is detected (step 314), access is permitted, and one or more of the operations described above (as for step 306 in FIG. 3A) may be performed. Of course, if the patterns (passwords) do not match (step 305), access is denied.

When the transaction with a remote server 122 requires a higher degree of security, for example in banking and commerce applications, the verification should be performed over a secured link (e.g. SSL) at the remote server 123. In this way the user device details and the user's voice (password) are shipped in a concealed form, and may not be captured by eavesdroppers.

For the implementation of access permission schemes such as that described in FIG. 3B, it is not needed to store the user's signature (or password) on the user device. Additionally, the magnetic strip 106 is not required in such access permission implementations (FIG. 3A and 3B). Another preferred embodiment of the invention is one in which the user device 100 is designed only to output ultrasonic and audio signals (without an input transducer 109 and ADC 104). In such implementations the user's voice stamp (or password) and user device details are stored in the user device's memory 101, and transmitted to the computerized system 110, for verification, whenever button 102 is pressed.

The method of the invention may be also utilized to implement Interactive Voice Response (IVR) utilities on the user device 100. IVR utilities are typically utilized to perform transactions and to interact with computer systems, as will be described herein after. Voice recognition schemes may be utilized to retrieve instruction from the user. In this way, the invention may be utilized to receive spoken digits or spoken names by the user device 100, and then to transmit a DTMF or an ultrasonic transmission to launch the proper service on the computer system 110, for example, to dial a phone (a calling card) number or to launch a web site or any desired application.

In another IVR implementation of the invention, the user is presented with a spoken menu (human or machine voice) played by the user device through the transducer 108. The user then speaks an option, and the user device performs the desired tasks. The user device 100 may be designed to receive information/instructions from an automated system (e.g., computerized system 110). Such an embodiment will be referred to herein as a 2-way user device. So that the Interactive Voice Response can also be a dynamic one (menu changes) if the card is 2-way. More particularly, the spoken menus may be modified along with other information stored in the user device. These modifications may be carried out by receiving ultrasonic/sonic signals from a computerized system or over a telephone line.

In yet another preferred embodiment of the invention, the IVR utility is utilized to set the user device, by speech, to the country in which the user is located at a given time. Once the user device retrieves the country in which it is located, it dials the local access number of the users calling service provider. The user device may be updated periodically with the worldwide access numbers if it is a 2-way user device.

The invention may be also implemented to provide the user calculating means that are vocally effectuated. For example, the user device may be designed to comprise tip calculation, after paying for some kind of services, the user activates a tip calculating function (by pressing a button, or by vocally selecting the desired function from an IVR menu). Once the tip calculating function is activated, the user announces the invoice sum, which is collected by the user device. The user device then interprets the spoken sum, utilizing its voice recognition capabilities, the tip sum is calculated, and a voice signal (synthesized) is then output telling the user the sum of the tip.

Another preferred embodiment of the invention is one in which 'text to speech' utilities are embedded into the electronic user device 100. In 'text to speech' utilities the electronic card is provided with text information input, through the transmission of voice or modulated digital data transmitted to the card. The user device receives this transmission and plays it as an audio voice (man or machine voice) to the cardholder.

Figure 4:
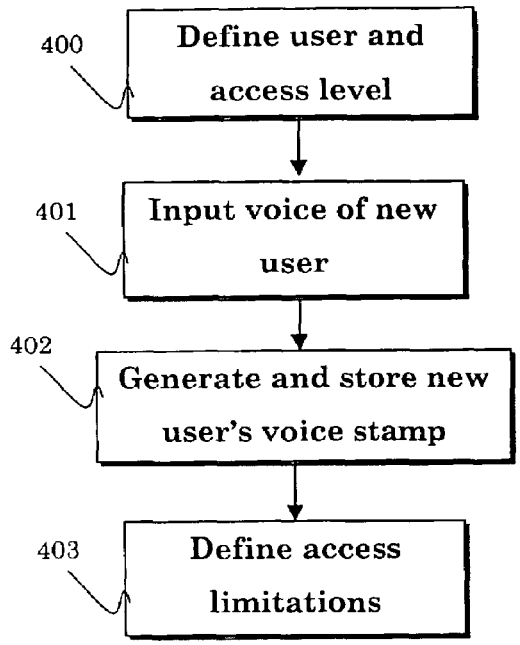
FIG. 4 is a flow chart illustrating a process for adding new users according to a preferred embodiment of the invention.

The invention may be implemented to allow authorization of temporary users, or to impose certain limitations on user accessibility to various functions of the user device. For instance, the invention may be implemented to allow the user to authorize other users. In such implementation a vocal menu may be presented to authorized users, once their identity is verified, to guide them through a process in which a temporary user, or a user having limited access, is added. A possible process for adding new users is illustrated in FIG. 4.

Initially, a new user and the access level required are defined in step 400. This step may comprise definitions for the type of usage the new user is authorized, for example, to allow such a user to access certain computer terminals, and optionally define a limited period of time in which the new user is allowed to access certain facilities and/or systems. In the next step, 401, the new user's voice is required as an input to the user device, which is then utilized in step 402 for generating and storing the new user's voice stamp. Optionally, in step 403, some limitation are defined regarding the use of the device's functions.

In a preferred embodiment of the invention, the user device is a credit card having a magnetic strip 106 and/or a smart chip 116. One may want to grant other user (e.g., family members, employees) permission to purchase with his user device. To do so, a new user is added, as described in steps 400 to 402, and in step 403 the user may define a limit the purchase sum allowed to some value, thereby limiting the amount of interactions allowed by the new user.

Figure 6:
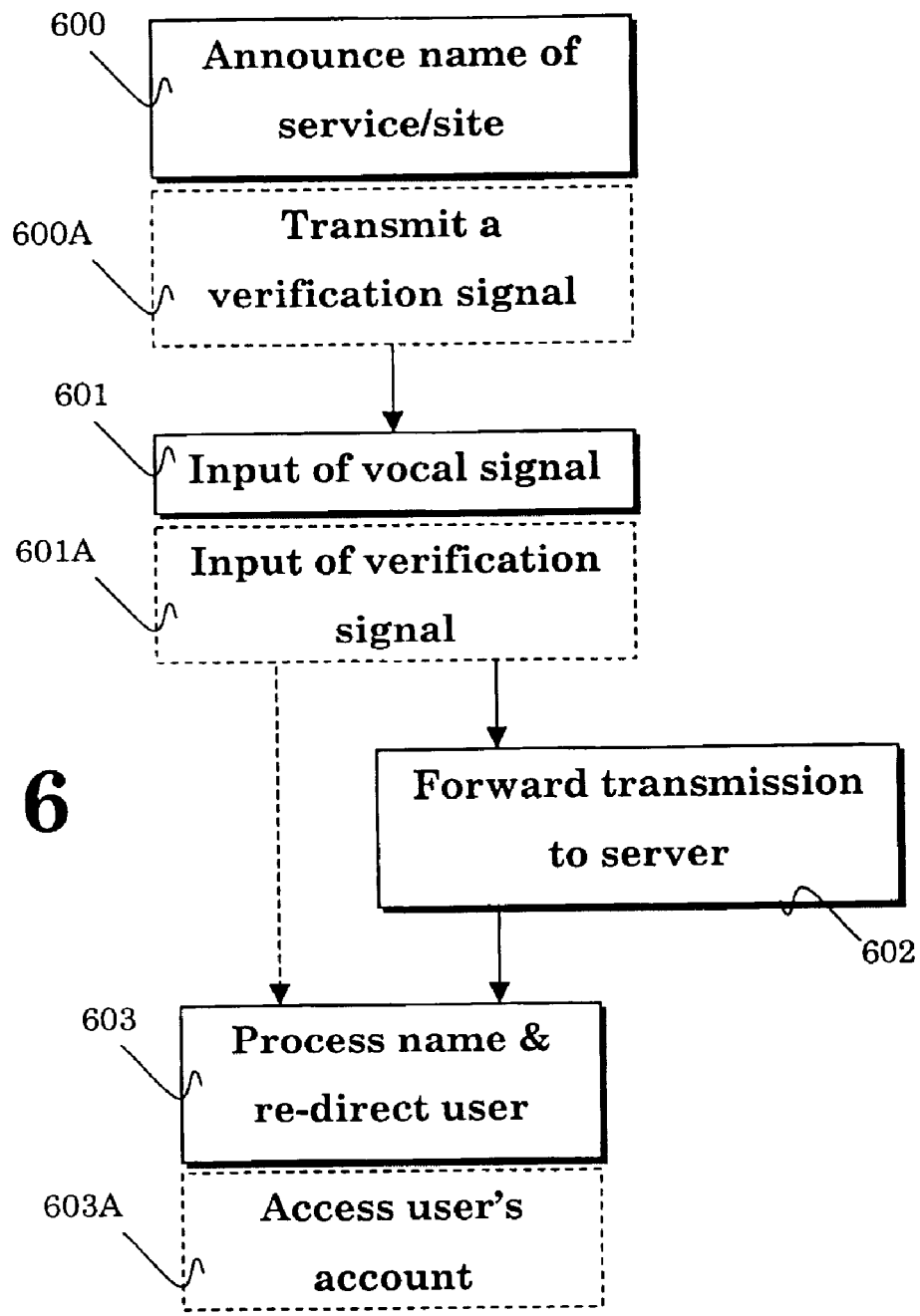
FIG. 6 shows a process for launching/starting an application or service according to the method of the invention.

The method of the invention may be utilized to launch/start web sites, computer applications or any online or phone service. FIG. 6 shows one possible process for launching/starting an application or service according to the method of the invention. Once an application program 115 is activated, or phone number of a desired service provider is dialed, the user announce the "name" of the service/site to which access is sought (for example, "AT&T" or "Yahoo"), step 600. Optionally, the user device 100 may be utilized in step 600A to transmit a verification signal, by pressing the press button 102, as was described herein above. In step 601, and the optional step 601A, the audio signals are received by the computerized system 110 via an audio input or via the telephony system if the service is accessed via the telephone.

After receipt of the audio signal(s) that were transmitted in step 600, and optionally in step 600A, in step 602 the transmission is forwarded to server 123, which provides voice recognition/verification services. The server 123 processes the transmission and interpret the "name" of the service/site in step 603. Using digital signal processing and voice recognition techniques, the server identify the site/service the user wish to launch/start, and the user is then redirected by the server 123. This may be performed by launching an Internet browser and loading the requested site, on the computerized system 110, or, if the service request is performed via the telephone, activating/connecting the/to requested telephony service.

If a verification signal was transmitted in the optional step 600A, the user also gains automatic access his private account in step 603A. This may be a private account on a server 123 (for instance, when accessing an Internet site via the Internet). Alternatively, this the may be bank account services that can be performed through the telephone.

The process described in FIG. 6 may be also performed by utilizing the user device 100, to input the user's vocal request. In such embodiment the user device is utilized for inputting the "name" of the requested site/service, and for transmitting an audio signal to the audio input of a computerized system 115, or to the audio input of the telephone. The user device 100 may be used to process and interpret the user's request, and then to forward the interpretation of the "name" of the requested service/site to the computerized/telephony system. In this case the services of voice verification/recognition server 123 are not required (step 602), so that step 603 may be performed directly after receipt of the user device transmission.

It should be clear that data communication between the user device 100, and the computerized system 110 may be performed by techniques employing modulation of data on an electromagnetic carrier(s) (radio transmission, infrared, etc.). However, employing other methods for data transmission will require the addition of dedicated hardware, while the preferred method of the invention employs hardware means existing in almost any personal computer system today (i.e. sound card having audio input and output).

Figure 5:
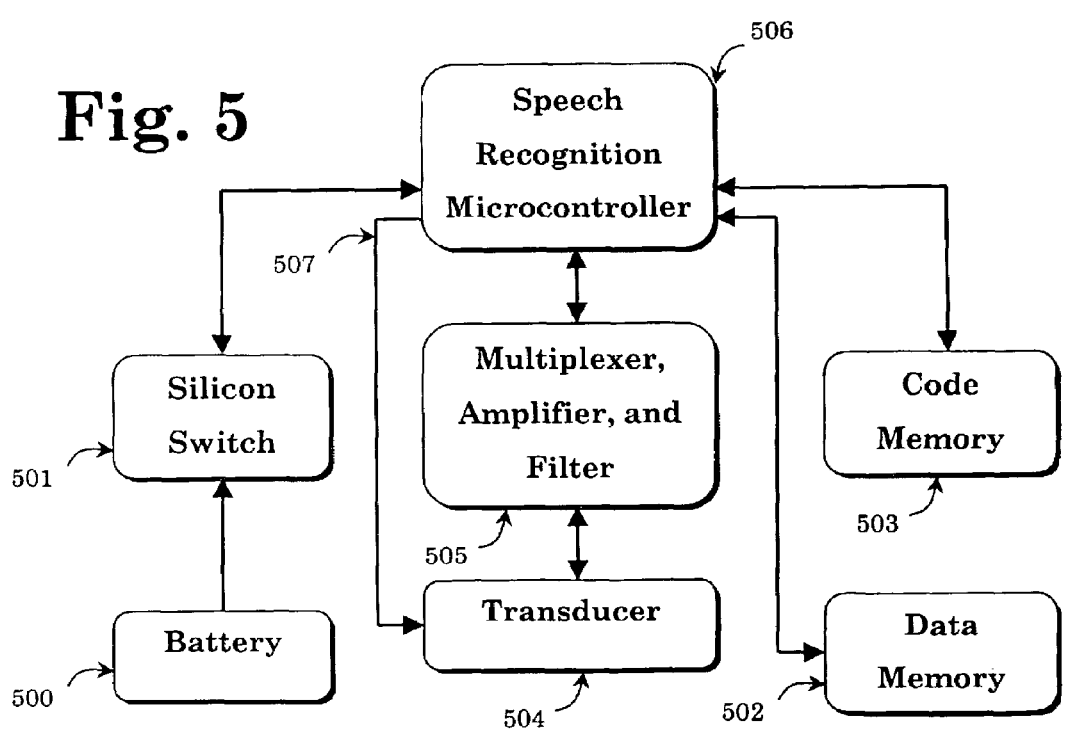
FIG. 5 is a block diagram illustrating hardware implementation according to a preferred implementation of the invention.

FIG. 5 is a flow chart illustrating a hardware implementation according to a preferred embodiment of the invention. This hardware implementation is based on Speech Recognition Microcontroller 506, which performs the operations of user verification, and the operation required for sending an ultrasonic/sonic signal through the transducer 504. The transducer can be any transducer that complies with the size (12±3 mm in diameter), Frequency response (0.5-5 kHz), and Sensitivity (about 60 db) demands which allows input/output of human voice, and that can be embedded into the user device.

The Speech Recognition Microcontroller 506 may be any device that comprises sampling capabilities of analog input signals, an ADC for converting the sampled values into digital form and a memory for storing the digital data. Such device also includes circuitry for sampling received signals in real time and processing means required for comparing digital data derived from real time sampling of received signals to the stored data and outputting the corresponding results. In addition such device comprises an external clock input for controlling the timing of operations wothin said device, so as to eliminate the need for an internal crystal clock oscillator (which is of unacceptable thickness) and to allow using an external clock that is implemented by using electronic (low profile) components that can be easily integrated into the user device.

Optionally, the Speech Recognition Microcontroller 506 may also include DAC (not illustrated), for synthesizing and outputting an analog voice signal. Such device may be for example, RSC-300/364 manufactured by Sensory (Santa Clara, Calif., USA).

The battery 500, is a 3 Volt cell battery, is preferably 20 mm in diameter and 0.4 mm in thickness (for example—Panasonic CR2004, CR2404, or any other type that has a 3 volt thin battery that can supply around 4 mA). All of the system components, 501 to 506, are electrically disconnected from the battery 500 when the system is not operating. System's operation is initiated by a silicon switch 501, which comprises a latching circuitry (not illustrated) which enables the Speech Recognition Microcontroller 506 to control the system's power supply once the silicon switch 501 is pressed. The multiplexer and amplifier circuitry 505(for example—Maxim's MAX4598, MAX4618, and MAX 4639), is utilized to amplify and filter the transducer 504 input signal, and to enable the transducer 504 to operate both as input and output device. The code memory device 503 is utilized to store the code for the Speech Recognition Microcontroller 506, and the data memory device 502 is utilized to store user voice stamp(s)(for example—Atmel AT27BV512, ST SST29VE020 for code memory and Microchip 24lc64, 24lc32 for data memory)

It should be noted that in a preferred embodiment of the invention the code utilized for the user device operation is stored in the the Speech Recognition Microcontroller 506.

When the silicon switch 501 is pressed, the system power supply is latched, and the system powered up. The Speech Recognition Microcontroller 506 outputs an audio (or visual, if the user device comprise a LED) signal indicating that the user device is activated. The Speech Recognition Microcontroller 506 sets the multiplexer and amplifier circuitry 505 receive an input signal via the transducer 504. The user's voice signal is received by the transducer 504, amplified and filtered by circuitry 505, and sampled by the Speech Recognition Microcontroller 506. The Speech Recognition Microcontroller 506 then filters and amplify the sampled signal and extract the user's voice pattern parameters. The user's voice pattern parameters are then compared to the voice stamp stored on the data memory device 502.

As illustrated in FIG. 5, the Speech Recognition Microcontroller 506 is always connected to the transducer 504, through output line 507. This connection is utilized for outputting an FSK modulated signal. In another preferred embodiment of the invention two transducers are utilized, one for outputting ultrasonic signals, and the other for outputting sonic signals.

The user device should be designed and configured to enable minimization of current consumption. In order to reduce the current consumption one or more of the following may be performed:

- reduction of the working voltage (from 5 or 3 Volts down to 2.2/2.4 Volts);
- shutting down unessential components, for instance, inactivation of the amplifier when signal input is computed (Can save around 1 mA); and
- lowering the Speech Recognition Microcontroller working speed (From a 14.3 Mhz frequency to around 7 Mhz).

The above examples and description have of course been provided only for the purpose of illustration, and are not intended to limit the invention in any way. As will be appreciated by the skilled person, the invention can be carried out in a great variety of ways, employing different techniques from those described above, all without exceeding the scope of the invention.

The invention claimed is:

1. A stand alone credit-card sized apparatus capable of receiving and processing audio signals, comprising:
   a power source;
   an audio or visual output device;
   an input device capable of receiving human voice inputs;
   a data processing device configured to process human voice inputs received by the input device and to generate a packet of digital data indicating a result of the processing; and
   transmission circuitry adapted to modulate an audio or visual signal with the packet of digital data and transmit the modulated audio or visual signal through the output device.

2. An apparatus according to claim 1, wherein the output device comprises a device for outputting human-audible sounds.

3. An apparatus according to claim 1, comprising a database of voice patterns and wherein the data processing device is adapted to compare human voice inputs to the voice patterns of the database.

4. An apparatus according to claim 3, wherein the data processing device is adapted to activate an application if a match is found in the comparison.

5. An apparatus according to claim 3, comprising a data provision unit and wherein the data processing device is adapted to activate the data provision unit, if a match is found in the comparison.

6. An apparatus according to claim 5, wherein the data provision unit comprises a magnetic strip.

7. An apparatus according to claim 3, wherein the data processing device is adapted to compare human voice inputs to the voice patterns of the database, with regard to their general voice characteristics.

8. An apparatus according to claim 3, wherein the data processing device is adapted to compare human voice inputs to the voice patterns of the database, with regard to their word content.

9. An apparatus according to claim 1, wherein the transmission circuitry is adapted to transmit the packet of digital data through the output device on an ultrasound signal.

10. An apparatus according to claim 1, wherein the transmission circuitry is adapted to transmit the packet of digital data through an audio output device, modulated on an human audible signal.

11. An apparatus according to claim 1, wherein the packet includes user identification data.

12. An apparatus according to claim 1, wherein the packet includes a digitization of a human voice input.

13. A method of processing audio signals, comprising:
    receiving a human voice input by a stand alone credit-card sized apparatus;
    processing the human voice input, by the credit card sized apparatus, so as to generate a packet of digits indicating a result of the processing;
    modulating an audio or visual signal with the packet of digits; and
    transmitting the modulated audio or visual signal through an output device of the stand alone credit-card sized apparatus.

14. A method according to claim 13, wherein transmitting the modulated audio signal comprises transmitting over a telephone network.

15. A method according to claim 13, comprising receiving the modulated audio signal by a computerized system through a regular sound card.

16. A stand alone credit-card sized apparatus capable of receiving and processing audio signals, comprising:
    a power source;
    an output device adapted to output at least one of human-perceptible sights and sounds;
    an input device capable of receiving human voice inputs;
    a data processing device configured to process human voice inputs received by the input device and to generate a result of the processing; and
    emission circuitry adapted to provide a human perceptible signal representing the result, through the audio output device.

17. A credit-card sized apparatus capable of receiving and processing audio signals, comprising:
    a power source;
    an audio output device;
    an input device capable of receiving human voice inputs;
    a data processing device configured to process human voice inputs received by the input device and to generate a packet of digital data indicating a result of the processing; and
    transmission circuitry adapted to modulate an audio ultrasound signal with the packet of digital data and transmit the modulated audio signal through the audio output device.

* * * * *